United States Patent [19]

Kawabe et al.

[11] Patent Number: 5,316,617
[45] Date of Patent: May 31, 1994

[54] THIN FILM MAGNETIC HEAD AND METHOD OF MANUFACTURING THE SAME

[75] Inventors: Takashi Kawabe; Moriaki Fuyama, both of Hitachi; Shinji Narishige, Hiratsuka; Akira Onuma; Tetsuya Okai, both of Hitachi; Yutaka Sugita, Tokorozawa; Shin-ichi Hara, Odawara, all of Japan

[73] Assignee: Hitachi, Ltd., Tokyo, Japan

[21] Appl. No.: 57,020

[22] Filed: May 5, 1993

Related U.S. Application Data

[63] Continuation of Ser. No. 691,844, Apr. 26, 1991, abandoned.

[30] Foreign Application Priority Data

Apr. 27, 1990 [JP] Japan .................................. 2-110501

[51] Int. Cl.$^5$ ............................ B44C 1/22; C23F 1/00
[52] U.S. Cl. .................................... 156/643; 156/655; 156/656; 156/659.1; 156/661.1; 156/667; 29/603; 252/79.1
[58] Field of Search ............... 156/643, 652, 655, 656, 156/659.1, 661.1, 667; 252/79.1; 29/603; 360/122

[56] References Cited

U.S. PATENT DOCUMENTS

| | | | |
|---|---|---|---|
| 4,592,801 | 6/1986 | Hara et al. | 156/643 |
| 4,791,719 | 12/1988 | Kobayashi et al. | 29/603 |
| 4,971,896 | 11/1990 | Kawabe et al. | 156/643 X |
| 4,992,901 | 2/1991 | Keel et al. | 156/661.1 X |

FOREIGN PATENT DOCUMENTS

| | | |
|---|---|---|
| 58-101428 | 6/1983 | Japan . |
| 59-222933 | 12/1984 | Japan . |
| 60-37130 | 2/1985 | Japan . |
| 60-115232 | 6/1985 | Japan . |

*Primary Examiner*—William Powell
*Attorney, Agent, or Firm*—Antonelli, Terry, Stout & Kraus

[57] ABSTRACT

A thin film magnetic head comprising a substrate on which are successively formed a base layer, a lower magnetic film, a gap layer, an insulator layer, a conductor coil, an upper magnetic film, and a first mask, is manufactured by a method in which one or more of a gas which can be expressed by the general formula of CnHxFy (where $n \geq 1$, $x+y=2n+2$, $x>0$, $y>0$, and $x \geq y$); and a gas which can be expressed by the general formula of CnHxFy (where $n \geq 1$, $x+y=2n+2$, $x \geq 0$, $y \geq 0$, and $x<y$) is used. The structure of the magnetic head thus obtained is such that, at a height near the interface between the mask and the upper magnetic film provided therebelow, the angle defined by the side edge surfaces of the mask and the above-mentioned interface ranges from 75° to 90°.

15 Claims, 11 Drawing Sheets

MIXTURE OF $CH_2F_2$ AND $CHF_3$ IS USED AS ETCHING GAS

THIN FILM MAGNETIC HEAD AND METHOD OF MANUFACTURING THE SAME

This application is a Continuing application of application Ser. No. 07/691,844, filed Apr. 26, 1991, now abandoned.

BACKGROUND OF THE INVENTION

This invention relates to a thin film magnetic head and, in particular, to a thin film magnetic head having a high precision magnetic film pattern. This invention also relates to a method of manufacturing such a thin film magnetic head.

The recording density of a magnetic recording apparatus, such as a magnetic disc apparatus or a VTR, is determined by the product of a width of a recording track and a length of the recording bit. The width of the recording track is determined by the width of the tip section of the magnetic film of the thin film magnetic head used (hereinafter referred to as "the track width"). Therefore, to attain a high recording density with such apparatuses, it is required to make the track width small and, at the same time, to prepare a number of magnetic thin films, which are given as patterns on a substrate formed of an alumina-system material, with high precision in terms of track width.

A typical track width formation technique for a thin film magnetic head is disclosed in JP-A-60-37130.

In accordance with the prior-art method, a thin film magnetic head is prepared by the following processes:

a. Successively formed on the surface of a substrate are a base film, a lower magnetic film, a gap layer (formed, e.g., of alumina ($Al_2O_3$)), an insulator layer, a conductor coil arranged within the insulator layer, an upper magnetic film, and an alumina film;

b. A photoresist layer is applied onto the alumina film in such a manner as to form a desired pattern;

c. Using the photoresist layer as a mask, a etching process is performed on the alumina film by a reactive ion beam etching method using $CF_4$ gas or a carbon fluoride gas such as $C_2F_6$ or $CHF_3$; and d. Using the patterned alumina film as a mask, a pattern of the upper magnetic film is formed by ion beam etching using argon gas.

In accordance with this method, a number of thin film magnetic head units are simultaneously formed on a single substrate, and, by severing this substrate, each of the units can be obtained.

In the thin film magnetic head thus obtained, a magnetic circuit is formed by the lower and upper magnetic films, between which the insulator layer and the conductor coil are arranged, with the lower magnetic film, the gap layer, and the upper magnetic film partly extending, in the form of tongue-like extensions, to the exterior, beyond the range of the insulator layer. The extension of these tongues is effected in such a manner that the upper magnetic film is lowered to approach the gap layer on the lower magnetic film, gradually, along the side edge of the insulator layer, which are formed as sloping faces. The writing or reading of data to or from the recording medium is effected through the gap layer between the lower and upper magnetic films in the tongue-like extensions.

The width of the upper magnetic film in its tongue-like extension, i.e., the lateral width of the tip section of the upper magnetic film facing the recording medium at a right angle when used as a magnetic head device, constitutes the track width. To make this track width as small as possible and with high precision (i.e., uniformly) among a large number of thin film magnetic heads produced, it is necessary to enhance the precision in the above process b in terms of the width of the photoresist film, the precision in the process c in terms of the width of the alumina film, and the precision in the process d in terms of the etching performed on the photoresist film. Above all, the precision in the width of the photoresist film and that in the width of the alumina film are significant factors in the determination of the track width.

SUMMARY OF THE INVENTION

Thus, it is an object of this invention to make it possible to produce a large number of thin film magnetic heads each having a track width as small as possible and with high precision (i.e., uniformly) among them.

Another object of this invention is to provide a thin film magnetic head which has a sufficiently small track width and which, when produced in large numbers, involves little inter-head variation in terms of track width.

In a first aspect of this invention, the above objects are achieved by a thin film magnetic head comprising a substrate on which are successively formed a based film, a lower magnetic film, a gap layer, an insulator layer, a conductor coil, an upper magnetic film, and a protector layer, wherein a mask for etching the upper magnetic film is formed directly on the surface of the upper magnetic film, and wherein, at a height near the interface between the mask and the upper magnetic film therebelow, the angle defined by the side surfaces of the end edges of the mask and the above-mentioned interface, i.e., the side surface angle of the mask ranges from 75° to 90°. In a thin film magnetic head in which the side surface angle of the mask is in the range of 75° to 90°, the side surfaces of the end edges of the upper magnetic film exhibit a desirable tapered angle. That is, the tapered angle of the side surfaces of the end edges of the upper magnetic film with respect to the interface between the upper magnetic film and the insulating film provided therebelow is close to 90° and is approximately equal to the side surface angle of the mask Such formation of the end edges of the upper magnetic film is a result of a successful etching of the upper magnetic film, performed by utilizing the mask. In other words, by setting the side surface angle of the mask within the range of 75° to 90°, the side edge surfaces of the mask become less subject to etching when etching the upper magnetic film, which ensures the etching of the upper magnetic film being performed as designed, with the result that a large side surface tapered angle of the upper magnetic film is obtained. The width of the tip section of a correctly etched upper magnetic film, i.e., a track width of 10 μm or less, which has conventionally been regarded as difficult to attain, is formed with high precision, thereby achieving a substantial improvement in terms of the recording density of a magnetic recording apparatus.

Aluminum oxide (alumina) may be suitably employed as the mask material. The upper magnetic film need not be a unitary layer; instead, it may consist of at least two magnetic films and at least one nonmagnetic film.

In a second aspect of this invention, with a view to achieving the above objects, there is provided a method of manufacturing a thin film magnetic head, comprising the steps of:

a. forming, successively on a substrate, a base layer, a lower magnetic film, a gap layer, an insulator layer, and a conductor coil;
b. coating the gap layer and the insulator layer formed with an upper magnetic film;
c. coating the upper magnetic film with a first mask;
d. coating the first mask with a second mask which enables the first mask to be selectively etched;
e. performing etching on the first mask; and
f. performing etching on the upper magnetic film masked by the first mask.

The substrate is suitably formed of an alumina-system material, the base film of alumina, the lower magnetic film of permalloy (a general term for Ni-Fe-system high magnetic permeability alloys containing 35 to 80 wt% of Ni), the gap layer of alumina, the insulator layer of an organic resin, the first mask of alumina, and the second mask of a photoresist layer.

To perform etching on the aluminum oxide constituting the first mask, either of the following two types of gases is suitably used:

a hydrocarbon fluoride gas which can be expressed by the following general formula:

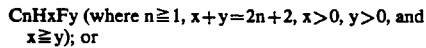
$C_nH_xF_y$ (where $n \geq 1$, $x+y = 2n+2$, $x>0$, $y>0$, and $x \geq y$); or a gas mixture consisting of a hydrocarbon fluoride gas which can be expressed by the following general formula:

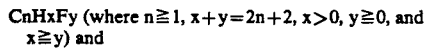
$C_nH_xF_y$ (where $n \geq 1$, $x+y = 2n+2$, $x>0$, $y \geq 0$, and $x \geq y$) and a hydrocarbon fluoride gas which can be expressed by the following general formula:

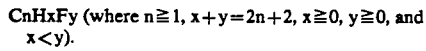
$C_nH_xF_y$ (where $n \geq 1$, $x+y = 2n+2$, $x \geq 0$, $y \geq 0$, and $x<y$).

DETAILED DESCRIPTION OF THE INVENTION

Figure 1:
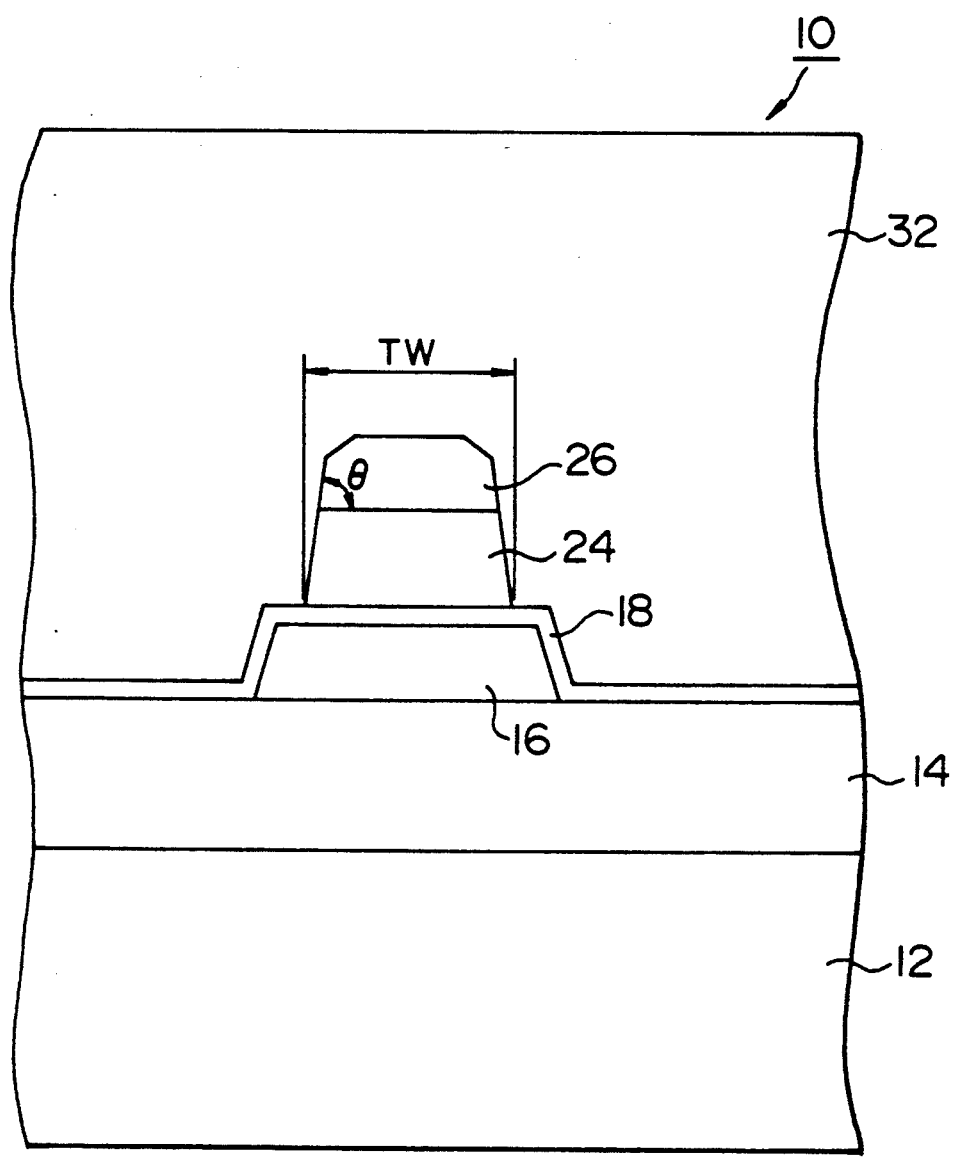
FIG. 1 is a front view of a thin film magnetic head in accordance with an embodiment of this invention as seen on the side thereof which faces a recording medium.

As stated above, the precision in terms of the width of the second mask (the photoresist film) and the precision in terms of the width of the first mask (the alumina film) are significant factors in determining the track width. To improve the precision in the width of the second mask, it is necessary to form this mask with a small thickness. And, to improve the precision in the width of the first mask, the ratio of the etching rate for the first mask to the etching rate for the second mask (hereinafter referred to the "etching selection ratio") must be made large.

However, if reactive ion beam etching is performed on the first mask, in accordance with a prior-art technique as shown in JP-A-60-37130, the etching selection ratio is small (approximately 2 to 3 at the maximum) no matter which of $CF_4$ gas, $C_2F_6$ gas or $CH_3$ gas may be used. This situation has to be coped with by making the thickness of the second mask large, which means the precision in the width of the second mask cannot be improved. Moreover, there is a problem that the side surface tapered angle ($\theta$) of the first mask cannot be made large. Thus, it has been ascertained that, with a thin film magnetic head prepared by such a prior-art technique, the side surface tapered angle ($\theta$) of the first mask when performing etching on the upper magnetic film is 70° at the maximum even if the process conditions are optimized. This is a relatively small value; as this side surface tapered angle ($\theta$) is diminished, the side surfaces of the end edges of the first mask become more subject to etching when forming the upper magnetic film pattern by etching, so that it is difficult to reduce the track width and enhance the precision in terms of it. Specifically, in the case of magnetic heads whose side surface tapered angle ($\theta$) is not more than 70°, the track width variation among them is approximately ±1.0 μm, and this large variation constitutes a bottleneck to an improvement in terms of recording density in a magnetic recording apparatus.

Further, when performing etching on the first mask (an alumina film) on the upper magnetic film by a prior-art technique, the completion of the etching on the first mask is followed by etching of the exposed upper magnetic film. This is attributable to the fact that, when performing etching on the first mask by using $CF_4$ gas, $C_2F_6$ gas or $CH_3$ gas, the upper magnetic film is etched at a rate which is approximately one tenth of the etching rate for the first mask. Accordingly, any variation in the thickness of the first mask causes the over-etching amount of the upper magnetic film to vary, which is followed by variation in the etching amount of the upper magnetic film, resulting in the track width precision being deteriorated. To avoid over-etching of the upper magnetic film, it has been necessary to develop an etching gas or an etching method which, though effective in etching the alumina constituting the first mask, would scarcely cause the magnetic film to be etched.

It was with this view in mind that the present inventors set about making this invention.

Figure 3:
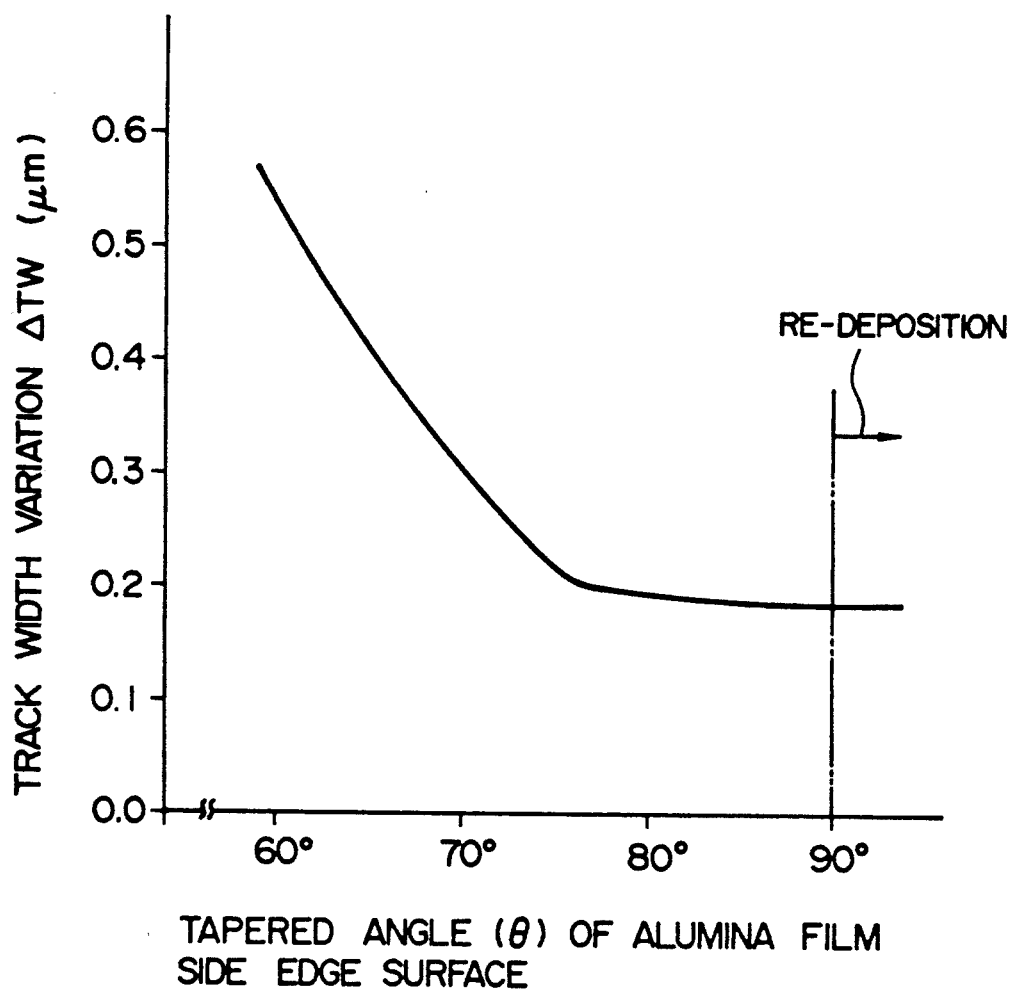
FIG. 3 is a graph which shows the effects of this invention, wherein is shown the relationship between the tapered angle ($\theta$) of the side surfaces of the alumina film and the track width variation ($\Delta TW$)

First, the present inventors examined the relationship between the configuration of the alumina film pattern constituting the mask for etching the upper magnetic film and the precision in track density. FIG. 3 shows the relationship between the side surface tapered angle $\theta$ of the alumina film and the track width variation $\Delta TW$. As can be seen from the drawing, if the angle $\theta$ is diminished, the side surfaces of the alumina film become more subject to etching when etching the magnetic film, resulting in the pattern width of the alumina film becoming subject to variation. As a result, $\Delta TW$ increases.

It has been ascertained, on the other hand, that, if the angle $\theta$ is augmented, $\Delta TW$ decreases, and, when the value of the angle $\theta$ gets beyond 75°, $\Delta TW$ takes substantially a constant value. If, however, the angle $\theta$ becomes larger than 90°, the particles sputtered from the substrate when etching the magnetic film become liable to deposit to the side edge surfaces of the alumina film. Thus, the re-deposition effect is increased to prevent the correct pattern configuration from being maintained, thus making it impossible for a desirable upper magnetic film pattern to be formed.

It has been found, from the above results, that, to obtain a high precision magnetic film pattern, the side edge surface tapered angle of the alumina film must be in the range of 75° to 90°.

Next, an examination of the influence of the track width on the value of $\Delta TW$ showed that, the smaller the track width, the more subject to variation the value of $\Delta TW$ becomes with respect to the angle $\theta$, and that, when the track width is less than 10 $\mu$m, the effect obtained by making the angle $\theta$ 75° or more is large. It should be noted here that the value of $\Delta TW$ shown in FIG. 3 is that in the case where the width of the alumina film pattern is constant. Accordingly, the value does not represent the track width variation of a real magnetic head. To give a specific value of track width variation, in the case of a track width of 10 $\mu$m, $\pm 10$ $\mu$m has been the limit for the prior-art techniques. With a magnetic head having the structure of this invention, this can be reduced to $\pm 0.8$ $\mu$m or less.

While the above description has been given with reference to the case where an alumina film similar to the one in the prior art is used as the first mask for etching the upper magnetic film, it is not always necessary to specify the material of the first mask to attain the effects of this invention. For example, the film may also be formed of silicon dioxide, carbon, or titanium oxide.

Further, application of the present invention makes it possible to obtain a thin film magnetic head with a high level of precision in terms of track width even in a case where a multilayer magnetic film is used, which has been difficult to process with high precision by the prior-art techniques.

Further, this invention helps to improve the recording density of a magnetic recording apparatus, making it possible to realize, for example, a magnetic disc apparatus with a track density of 2000 tracks/inch.

To form an alumina film pattern as described above, which has a large side edge surface tapered angle, it is desirable to use an etching gas, such as $CH_2F_2$, $CH_3F$, $C_2H_3F_3$ or $C_2H_4F_2$, instead of using one used in the prior art, such as $CF_4$, $C_2F_6$ or $CHF_3$. The composition formula of each of these gases can generally be given as CnHxFy (where $n \geq 1$; $x+y=2n+2$; $x>0$; $y>0$; and $x \geq y$).

By using these gases, the etching selection ratio between the alumina film and the photoresist, film which serves as the mask material for etching the alumina film, can be made much larger than in the prior art.

Figure 4:
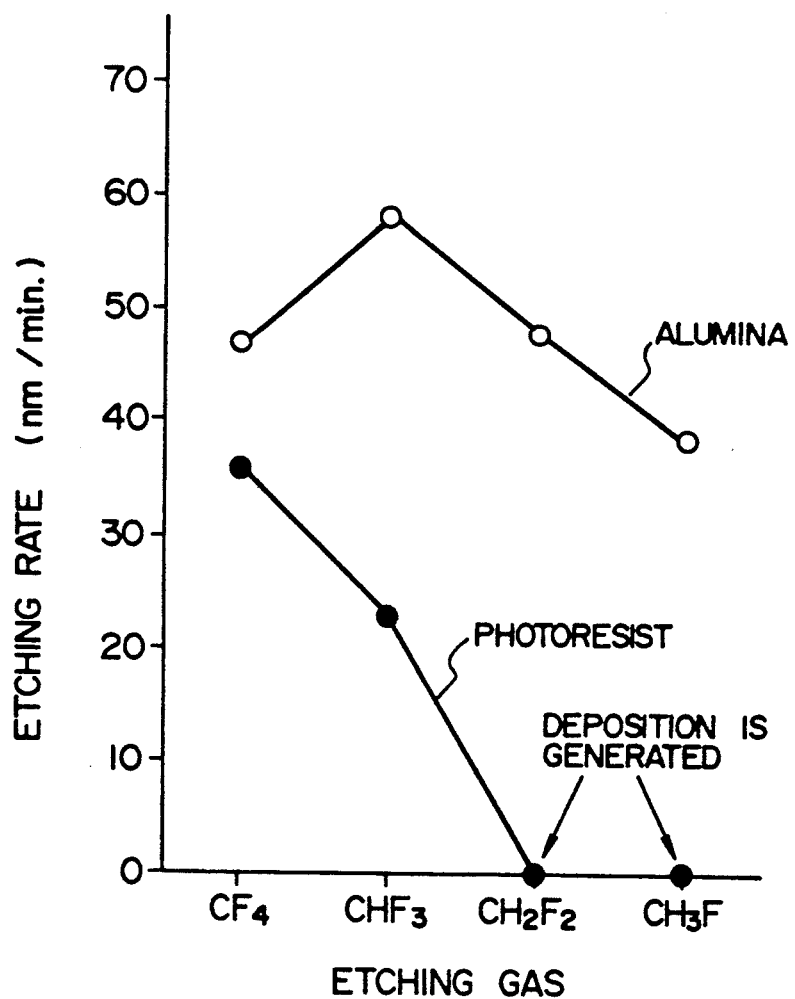
FIG. 4 is a graph showing the rates at which etching is performed on photoresist and alumina, respectively, when a gas which can be expressed by the formula $CH_xF_y$ ($x=0$ to 3, $y=1$ to 4) is used.

FIG. 4 shows, by way of example, the respective etching rates for the photoresist film and the alumina film when a gas which can be expressed as CHxFy ($x=0$ to 3, $y=1$ to 4) is used. In the case, for example, of $CHF_3$ gas shown in the prior art, the selection ratio is approximately 2, whereas, in the case where $CH_2F_2$ or $CH_3F$ gas is used, no etching of the photoresist film occurs, with the selection ratio being infinitely large.

Further, though not shown in FIG. 4, an etching rate measurement was performed on a permalloy (NiFe) film as a generally used magnetic film; in this case, the etching rate when using $CHF_3$ was 5 nm/min, whereas no etching occurred when $CH_2F_2$ or $CH_3F$ gas was used.

Thus, when a gas which can be expressed by the general composition formula CnHxFy (where $n \geq 1$; $x+y=2n+2$; $x>0$; $y>0$; and $x \geq y$) is used for etching, an alumina film is etched, whereas a photoresist or a permalloy film is not. Therefore, by performing the etching of the alumina film by using a photoresist or a permalloy film as the second mask material, the tapered angle of the alumina film side edge surfaces can be made larger, making it possible to obtain a high precision alumina film pattern. The second mask need not necessarily consist of a photoresist film or a permalloy film; it may be an organic resin film or a metal film.

Further, if this gas is applied to the preparation of the above-described thin film magnetic head, the magnetic film is protected from being etched even if it is exposed after the completion of the etching of the alumina film, so that a high precision track width can be realized.

Further, in the case where a gas which can be expressed by the general formula CnHxFy (where $n \geq 1$; $x+y=2n+2$; x and $y>0$; and $x \geq y$) is used, the etching rate for the alumina film is relatively low, as compared to that in the case where, for example, $CF_4$ or $CHF_3$ gas is used, so that a deterioration in throughput is to be expected. Accordingly, by using a gas (CnHxFy (where $n \geq 1$; $x+y=2n+2$; $x \geq 0$; $y \geq 0$; and $x<y$)) which is capable of etching alumina at high speed together with the above gas CnHxFy ($x \geq y$) in an appropriate proportion, a high speed and high selection ratio etching can be achieved. In that case the mixture ratio of the two gases may be determined such that etching of a photoresist film or a metal film, which constitutes the second mask, can be substantially avoided (In practice, it is desirable that the etching rate be not higher than 3 nm/min).

For example, if etching is performed by using $CH_3F$ gas alone, the photoresist is not etched, with deposition of a polymer being generated on the photoresist film at a rate of 15 nm/min. In this case, the etching selection ratio of the alumina film is infinitely large; however, the alumina etching rate is 37 nm/min, which is rather low when compared to the 60 nm/min in the case of $CHF_3$. Thus, it takes rather long to complete the etching. Further, in some cases, the generation of a thick deposition film on the photoresist film can cause problems, such as contamination of the substrate.

If a gas consisting of a mixture of CHF$_3$ and approximately 22 vol% of CH$_3$F is used, no etching or deposition occurs on the photoresist film, and, at the same time, the alumina etching can be effected at a high rate of 55 nm/min. Thus, also when using some other type of gas, it is desirable that the gas be of a composition which helps to avoid not only etching of the mask but also deposition thereon.

Specifically, it is desirable that the gas used be of a composition which leads to an etching rate of 3 nm/min or less and a depositing rate of 10 nm/min or less.

When performing etching on an alumina film by using an etching gas as described above, the following should be noted: in the case, for example, of ion beam etching, the angle of incidence of the ion beam with respect to the substrate can be set within the range of 0° to 90°, and the etching rate varies depending upon the angle of incidence, so that it is desirable that an angle of incidence which helps to avoid etching and deposit on the mask be found in accordance with the composition of the etching gas and the mask material used, and that such an angle of incidence be applied to the etching. If, conversely, the angle of incidence is determined by some limitation in the manufacturing process, it is desirable that the composition of the etching gas be so controlled that the mask is protected from etching and, further, deposition on the mask.

Further, it is desirable that such parameters as have an influence on the etching rate, e.g., the gas pressure during etching and the acceleration voltage and current density of the ion beam, be also set such as to be adapted to the optimum condition mentioned above.

By thus keeping the side edge surface tapered angle of the alumina film pattern within the range of 75° to 90°, the side edge surfaces of the alumina film can be substantially protected from being etched, thus making it possible to form the upper magnetic film pattern with high precision.

Further, when a gas which can be expressed by the general formula CnHxFy (where n≧1; x+y=2n+2; x>0; y>0; and x≧y) is used as a means for etching the alumina film with high precision, the alumina film reacts with ions or radicals containing fluorine to form a reaction product and is etched by being sputtered by the particles which come flying next, whereas, at the surface of the photoresist or the metal film, the rate at which particles containing C (carbon), H (hydrogen) and F (fluorine) are polymerized to generate a film deposition is higher than the rate at which sputter etching takes place, so that the photoresist film or the metal film is not etched at all.

In the case where a gas which can be expressed by the general formula CnHxFy (where n≧1; x+y=2n+2; x≧0; y≧0; and x<y) is used, the rate at which sputter etching takes place is higher than the rate at which a polymerization film deposition is generated, also at the surface of the photoresist film or the metal film, so that even a photoresist film or a metal film is etched. Thus, by mixing these gases with each other in an appropriate proportion, a gas could be realized which would cause no etching or deposition on the surface of the photoresist or the metal film, thereby making it possible to perform a high precision etching on the alumina film.

EXAMPLE 1

Figure 2:
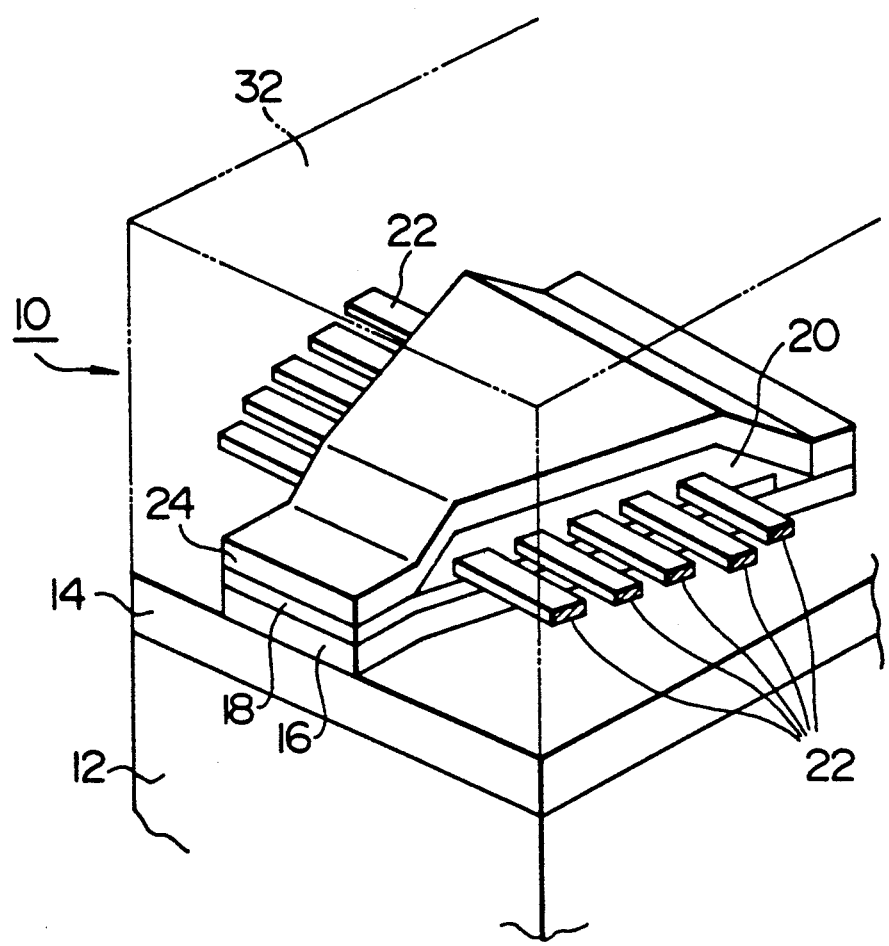
FIG. 2 is a perspective view of the thin film magnetic head.

The present invention will now be described in detail with reference to the accompanying drawings (FIGS. 1 and 2).

FIG. 1 is a diagram of a thin film magnetic head 10 as seen on the tip side thereof. That surface of the thin film magnetic head 10 which is shown in FIG. 1 faces a magnetic recording medium. The magnetic head 10 is composed of an alumina substrate 12 and the following layers which are successively formed thereon: a base film 14, a lower magnetic film (a permalloy film) 16, a gap layer (an alumina layer) 18, an insulating layer 20, a conductor coil 22 arranged within the insulating layer 20, an upper magnetic film (a permalloy film) 24, an alumina film 26 constituting the first mask, and an alumina layer 32 serving as a protector layer. The track width, which is the lower end width (TW) of the upper magnetic film 24, was set to 8.0 μm (FIG. 1).

In FIG. 1, the upper side ends of the alumina film 26 are beveled as to exhibit small a tapered angle. This beveled edges are a result of ion beam etching performed on the upper magnetic film 24 by using Ar gas. Even if the side edge surface tapered angle of the alumina film constituting the first mask is thus diminished in the top end section, the width of the upper magnetic film is determined by the lower end thereof. Thus, a high precision track width has been realized.

EXAMPLE 2

Figure 5:
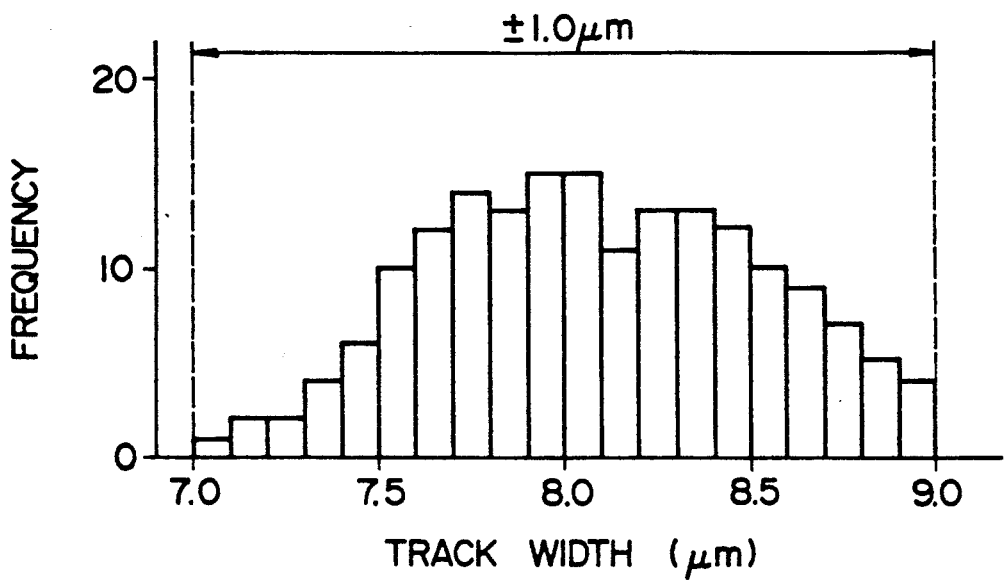
FIG. 5 is a histogram showing the track width distribution of a magnetic head with a conventional structure, which distribution is to be compared with that of this invention shown in FIG. 6.
Figure 6:
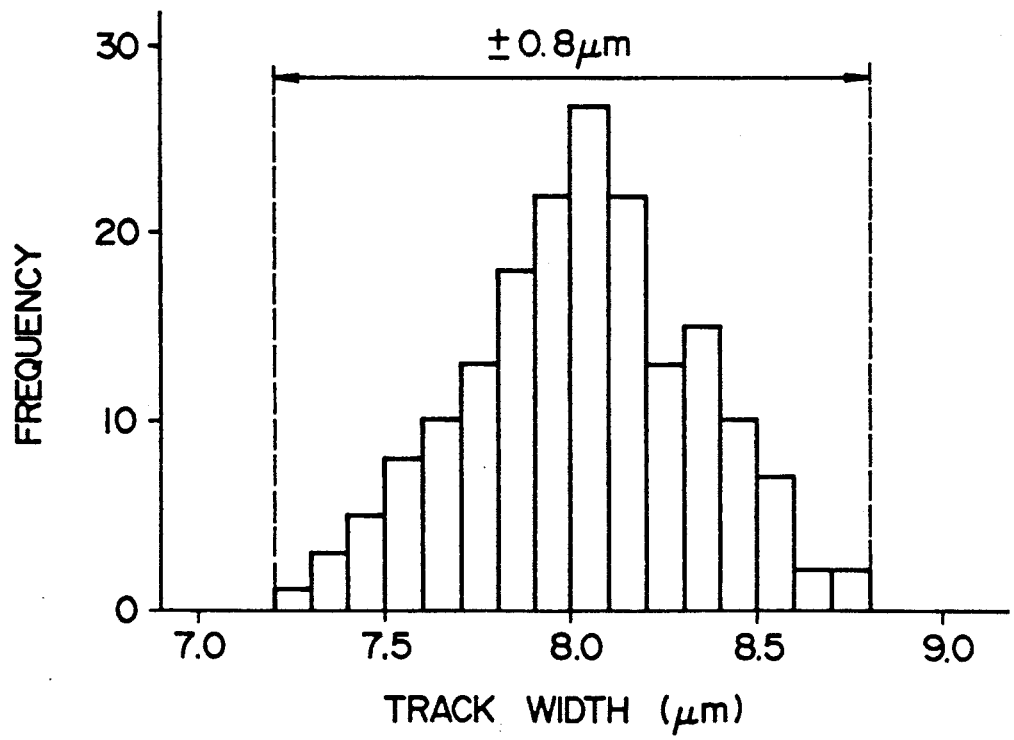
FIG. 6 is a histogram showing the track width distribution of a magnetic head in accordance with this invention.

FIG. 5 shows the track width distribution in a magnetic head of a conventional structure, and FIG. 6 shows the track width distribution in a magnetic head in accordance with the invention. In both cases, the track width was 8 μm. In the conventional structure, the side edge surface tapered angle of the alumina film constituting the mask was only 64° and the side edge surfaces were subject to etching, so that the track width varied by ±1.0 μm. In the magnetic head of the invention, in contrast, which had a tapered angle of 83°, the variation in the track width could be reduced to ±0.8 μm.

EXAMPLE 3

Figure 7:
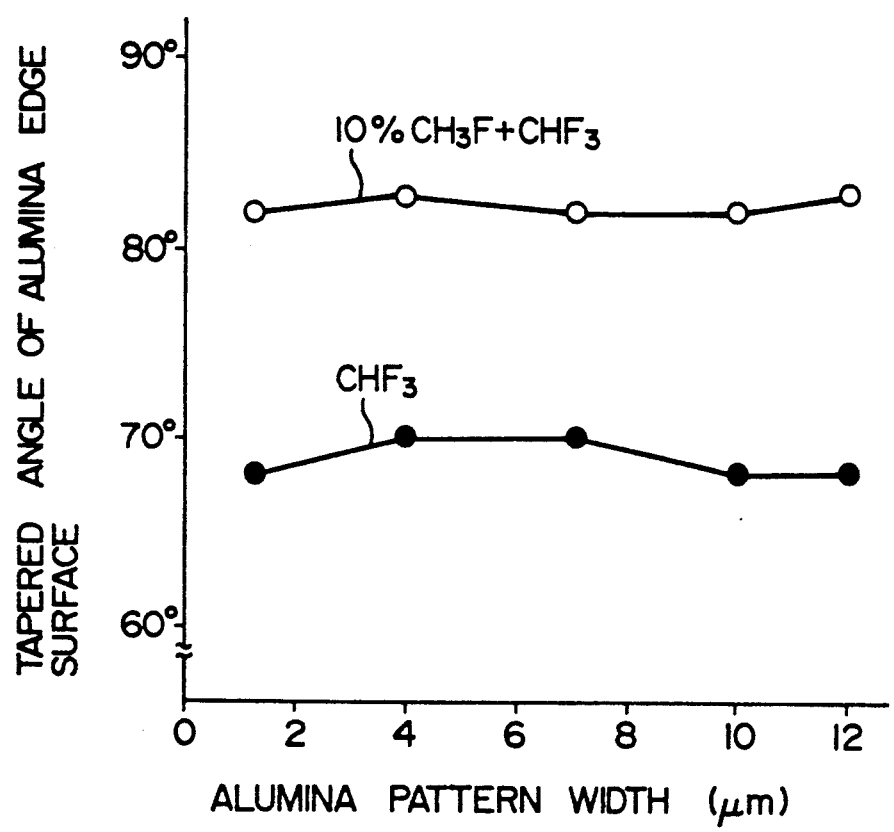
FIG. 7 is a graph showing the relationship between the tapered angle ($\theta$) of the alumina film side surfaces and the pattern width in a conventional example where $CHF_3$ gas is used and in an example according to this invention where a gas of 25 vol% of $CH_3F$ and $CHF_3$ is used.

FIG. 7 shows the relationship between the side edge surface tapered angle of the alumina film and the pattern width when CHF$_3$ gas is used (a prior-art example) and when a gas of 25 vol% of CH$_3$F+CHF$_3$ is used (the invention). A photoresist film was used as the second mask material. Due to the substantial increase in the ratio of the etching rate for the first mask to the etching rate for the second mask (the selection ratio), the application of the present invention resulted in the tapering angle to be increased from the approximately 70° of the conventional case up to approximately 82°.

Figure 8:
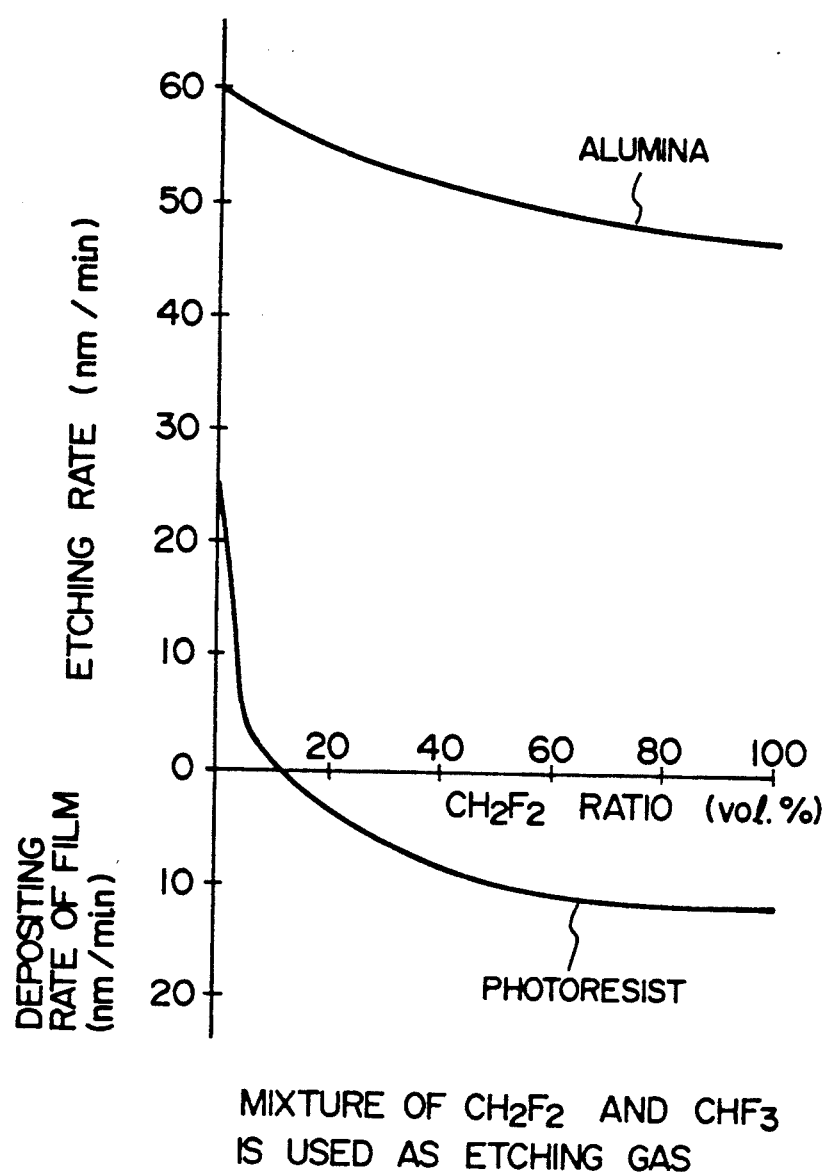
FIG. 8 is a graph showing the relationship between the gas mixing ratio and the etching rate in a case where $CH_2F_2$ and $CHF_3$ gases are used in a mixed form.

FIG. 8 shows the relationship between the mixture ratio of CH$_2$F$_2$ and CHF$_3$ gases and the etching rate when such a mixture gas is used. By adding 10 vol% of CH$_2$F$_2$ gas to CHF$_3$ gas, the etching rate for the photoresist was reduced to 3 nm/min. Further, when 50 vol% of CH$_2$F$_2$ gas was added to CHF$_3$ gas, the deposition rate on the photoresist film became 10 nm/min. These relationships were substantially the same in the cases where mixing is effected between the gas group: CH$_3$F, C$_2$H$_3$F$_3$, C$_2$H$_4$F$_2$ and the gas group: CF$_4$, CHF$_3$, C$_2$F$_6$, C$_3$F$_8$.

EXAMPLE 4

FIGS. 9A to 9E show an embodiment of a method of manufacturing a thin film magnetic head to which the present invention is applied. Each of the drawings shows the head structure in section. The basic concept of the manufacturing processes are shown in JP-A-60-37130, mentioned above as a well-known prior-art example. The feature of the manufacturing processes of the invention consists in the method of performing etching on the alumina film with high selection ratio.

Figure 9A:
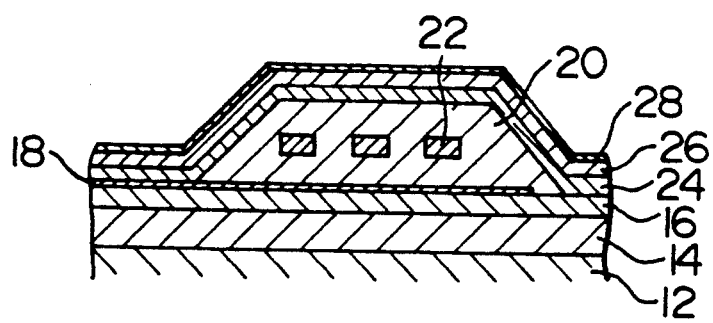
FIGS. 9A to 9E are cross-sectional views showing a method of manufacturing a thin film magnetic head in accordance with this invention.
Figure 9B:
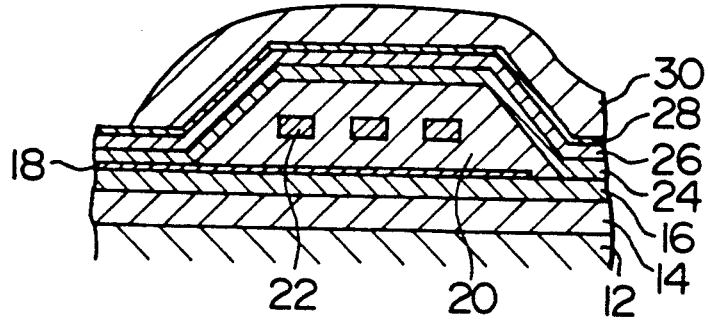

First, as shown in FIG. 9A, successively formed on a substrate 12 were an alumina layer 14 as the base layer, a permalloy film 16 as the lower magnetic film, an alumina film 18 as the gap layer, a conductor coil 22 of copper, and an organic resin layer 20 as the insulator layer. Formed successively on the organic resin layer 20 were a permalloy film 24 as the upper magnetic film, an alumina film 26, and a permalloy film 28 constituting the mask for alumina etching. Subsequently, as shown in FIG. 9B, a photoresist pattern 30 was applied to the permalloy film 28.

Figure 9C:
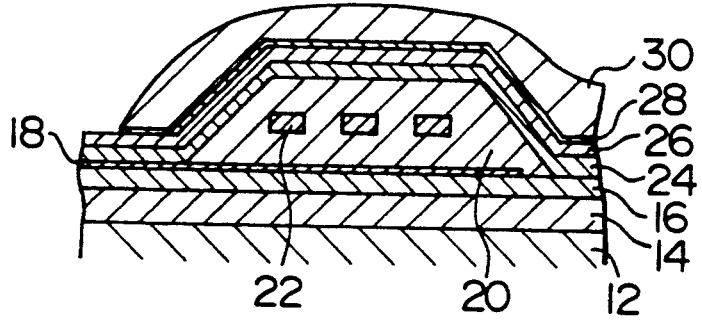
Figure 9D:
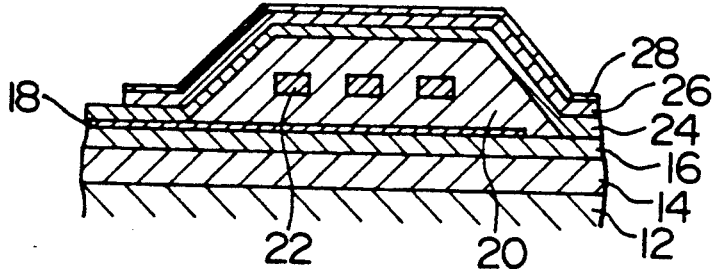

Then, as shown in FIG. 9C, using the photoresist 30 as a mask, patterning was performed on the permalloy film 28 by ion beam etching using Ar gas. Subsequently, the photoresist 30 was removed, and, as shown in FIG. 9D, patterning was performed on the alumina film 26 by ion beam etching using a mixture gas consisting of 37 vol% of $CH_2F_2 + CHF_3$. Since in this process the permalloy film 28 serving as a mask is not etched at all as stated above, its film thickness may be small; in this embodiment, it was 0.5 μm. For practical use, it is desirable that the film thickness be set at 1 μm or less taking into account the film thickness variation in the substrate or between batches, the film peripheral portions in the device step section, etc. The side edge surface tapered angle of the alumina pattern 26 thus obtained was 82°.

Figure 9E:
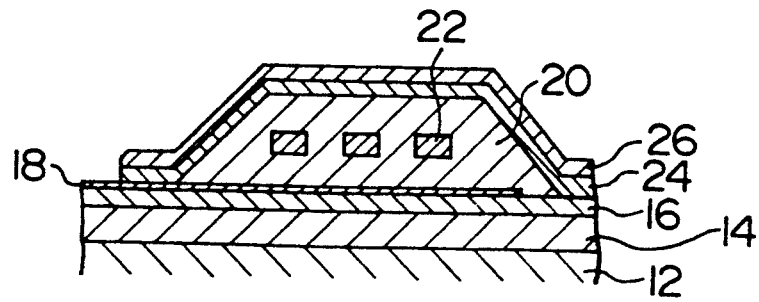

Subsequently, as shown in FIG. 9E, using the alumina film 26 as a mask, etching was performed on the permalloy film 24 by ion beam etching using Ar gas. In this process, the permalloy film 28, which had been previously used as a mask, was automatically removed because of its small film thickness. In this way, a method of manufacturing a thin film magnetic head having a high precision track width was realized.

As is apparent from the above description, by applying the magnetic head structure of this invention, the side surface etching amount when etching a magnetic film can be reduced, so that a thin film magnetic head having a high precision track width can be realized. Further, by applying the etching gas and the etching method of this invention, a high precision alumina film pattern can be formed. In addition, by using the manufacturing method of this invention, a substantial improvement can be attained in terms of the track width precision of a thin film magnetic head.

In the following, a brief description will be given of a magnetic disc apparatus equipped with a thin film magnetic head in accordance with this invention.

Figure 10:
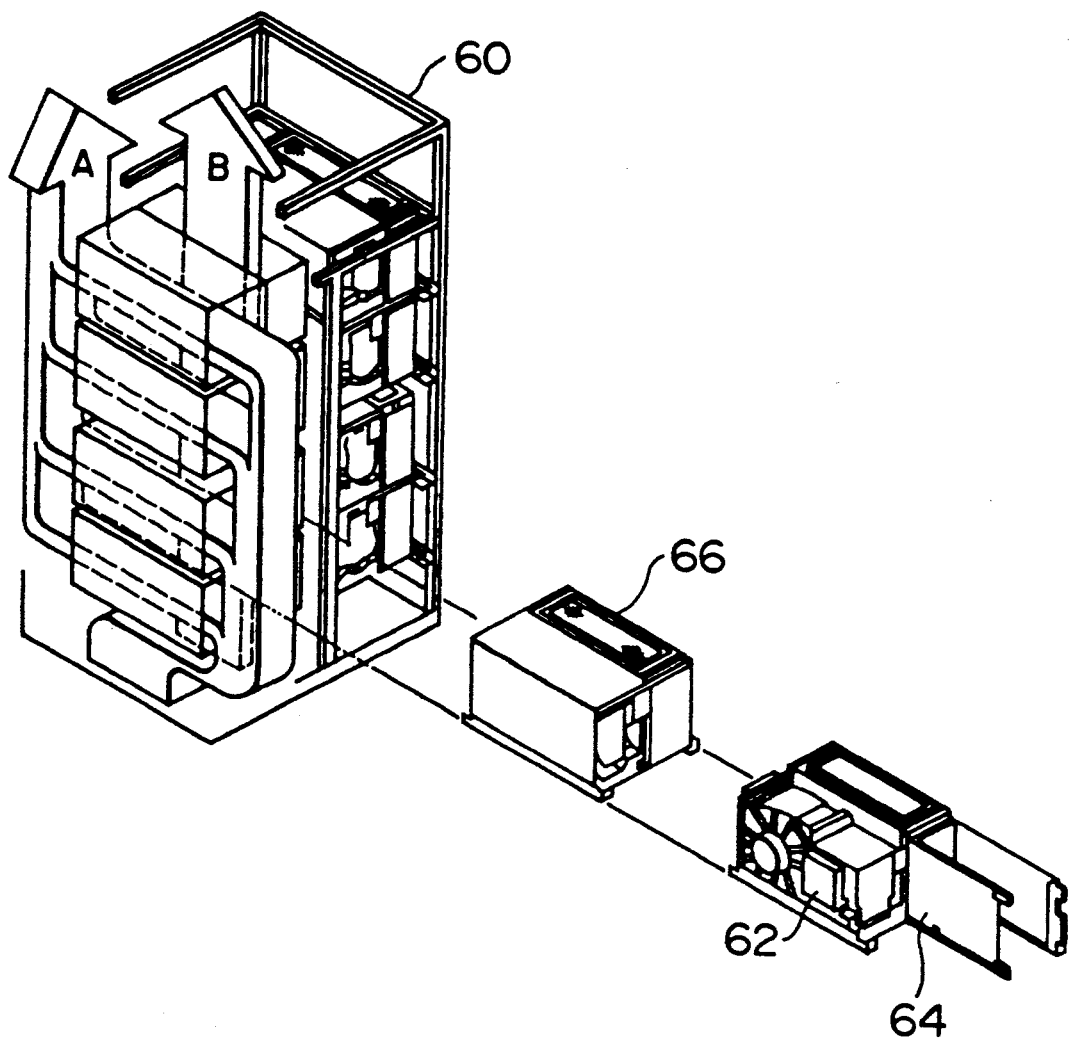
FIG. 10 is a schematic perspective view of a magnetic disc apparatus on which thin film magnetic heads in accordance with this invention are mounted.

FIG. 10 is a schematic perspective view of a magnetic disc apparatus on which thin film magnetic heads in accordance with this invention are mounted. The drawing shows the magnetic disc apparatus as lodged in a given space. Head/disc assembly units (HDU) 66, each composed of a head/disc assembly (HDA) 62 and an electronic circuit section 64, are lodged in a container 60. Further, an interface (not shown) with a calculator is also lodged in the container 60. There are eight HDUs 66 in all, which are lodged, two by two, in four stages. The length of one side of the bottom of the container 60 ranges from 0.5 to 1.5 m, and its height is approximately 2 m.

In FIG. 10, the reference symbols A and B indicate airflows for supplying the magnetic heads and the magnetic discs with fresh air.

Figure 11:
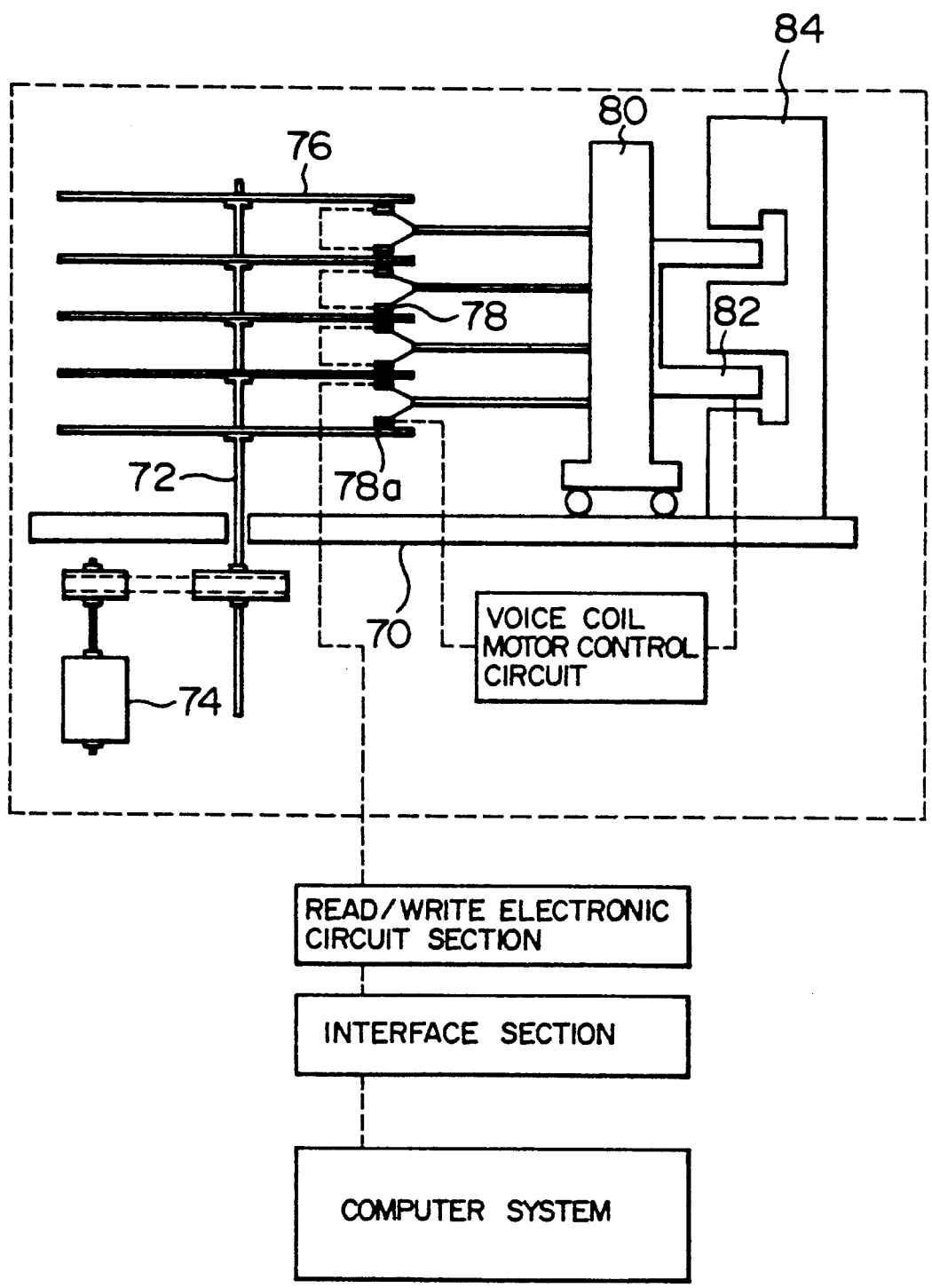
FIG. 11 is a conceptional diagram of a magnetic disc apparatus as an embodiment of this invention.
Figure 12:
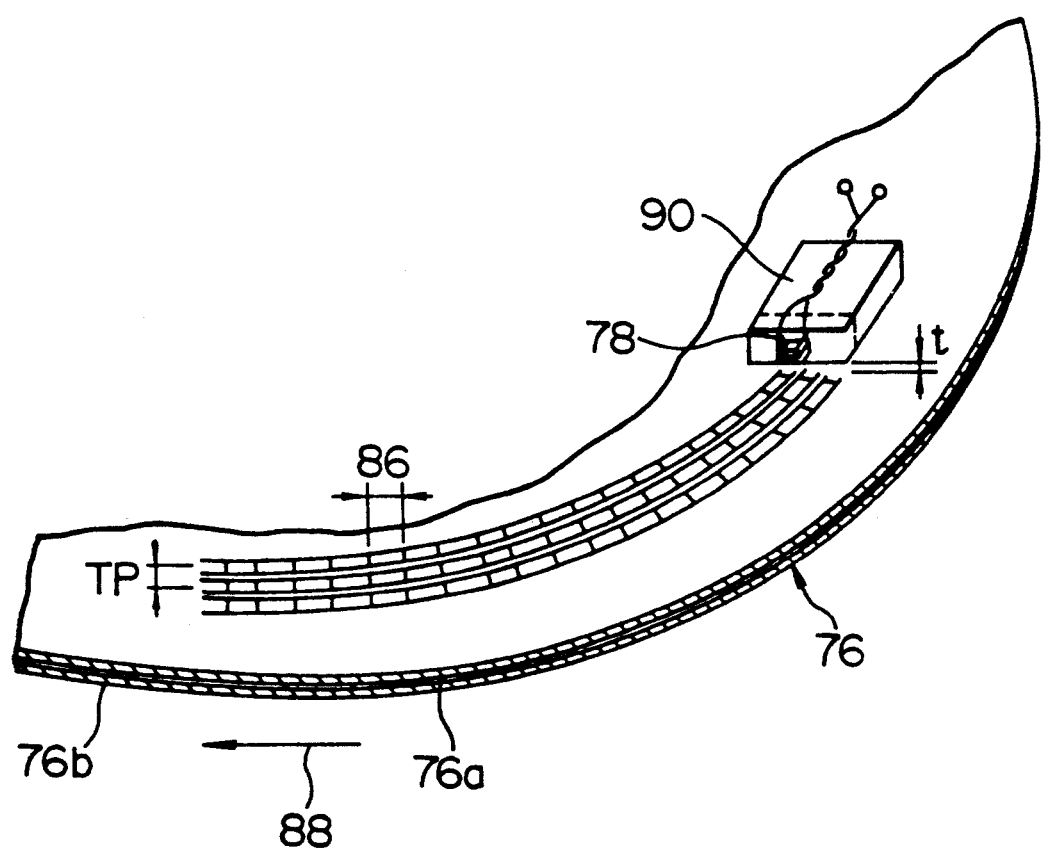
FIG. 12 is an enlarged perspective view showing the section around the thin film magnetic head which is shown in FIG. 11.

FIG. 11 is a conceptional drawing showing a magnetic disc apparatus constituting an embodiment of the present invention, and FIG. 12 is an enlarged perspective view showing a thin film magnetic head 78 and the sections around it.

The reference numeral 70 indicates a base, and the reference numeral 72 indicates a spindle. As shown in the drawing, a plurality of thin-film magnetic discs 76 are attached to a single spindle. As shown in FIG. 12, each thin film magnetic disc 76 consists of a nonmagnetic disc 76a formed of alumina or the like and a magnetic film 76b provided on at least one of the two sides of the non-magnetic disc. The magnetic film 76b includes a multitude of track grooves.

While in the example shown in FIG. 11 one spindle is equipped with five thin-film magnetic discs, this should not be construed as restrictive. Further, it is also possible to provide a plurality of spindles each equipped with a plurality of thin film magnetic discs.

The reference numeral 74 indicates a motor for driving the spindle 72 to rotate the thin film magnetic discs. The reference numeral 78 indicates a thin film magnetic head. The reference numeral 78a indicates a magnetic head for positioning. The reference numerals 80, 82, and 84 respectively indicate a carriage, a voice coil, and a magnet. The voice coil 82 and the magnet 84 constitute a voice coil motor. The head is positioned by means of the components 80, 82 and 84. The voice coil is connected to the magnetic heads 78 and 78a through a voice coil motor control circuit.

A read/write circuit discriminates between write and read information and supplies signals to the magnetic disc apparatus. An interface section connects a computer system and the magnetic disc apparatus to each other. An information processing system is a system having such a computer system and a magnetic disc apparatus as described above.

FIG. 12 is an enlarged view of a thin film magnetic head and a thin film magnetic disc. The reference numerals 90, 86 and 88 respectively indicate a slider, a recording wavelength, and the disc rotating direction. The reference symbol t indicates a height of the head flotation, and the reference symbol Tp indicates the track pitch.

Any one of the above-described thin film magnetic heads of this invention is suitable for use as a magnetic head to be mounted on such a magnetic head apparatus.

What is claimed is:

1. A method for patterning a material comprising aluminum oxide using an overlying mask pattern, comprising exposing portions of said material not covered by said overlying mask pattern to an ion beam in an etching gas atmosphere comprising a first hydrocarbon fluoride gas expressed by the following general formula:

$$C_nH_xF_y \text{ (where } n \geq 1, x+y=2n+2, x<0, y<0, \text{ and } x \geq y\text{).}$$

2. A method according to claim 1, wherein said etching gas atmosphere is a mixed gas atmosphere comprising said first hydrocarbon fluoride gas and a second hydrocarbon fluoride gas expressed by the following general formula:

CnHxFy (where $n \geq 1$, $x+y=2n+2$, $x \geq 0$, $y \geq 0$, and $x<y$).

3. A method according to claim 2, wherein said overlying mask pattern is made of a material selected from the group consisting of a photoresist, an organic resin and metal.

4. A method according to claim 1, wherein said overlying mask pattern is made of a material selected from the group consisting of a photoresist, an organic resin and metal.

5. A method of manufacturing a thin film magnetic head, comprising the steps of:
 (a) forming, successively on a substrate, a base layer, a lower magnetic layer, a gap layer and a conductor coil covered with a insulator layer:
 (b) coating an upper surface of the structure formed by step (a) with an upper magnetic film;
 (c) coating the upper magnetic film with aluminum oxide;
 (d) coating the aluminum oxide with a mask pattern;
 (e) etching the aluminum oxide; and
 (f) subsequently etching the upper magnetic film which is masked with the aluminum oxide, wherein:
 an etching gas used in step (e) for etching the aluminum oxide comprises a first hydrocarbon fluoride gas which is expressed by the following general formula:

CnHxFy (where $n \geq 1$, $x+y=2n+2$, $x>0$, $y>0$, and $x \geq y$).

6. A method according to claim 5, wherein said etching gas is a mixed gas comprising said first hydrocarbon fluoride gas and a second hydrocarbon fluoride gas expressed by the following general formula:

CnHxFy (where $n \geq 1$, $x+y=2n+2$, $x \geq 0$, $y \geq 0$, and $x<y$).

7. A method according to claim 6, wherein said mask pattern is made of a material selected from the group consisting of a photoresist, an organic resin and metal.

8. A method according to claim 5, wherein said mask pattern is made of a material selected from the group consisting of a photoresist, an organic resin and metal.

9. A method according to claim 5, wherein etching of the aluminum oxide is step (e) is performed by an ion beam etching method.

10. A method according to claim 6, wherein etching of the aluminum oxide is step (e) is performed by an ion beam etching method.

11. A method according to claim 5, wherein an etching rate for the mask pattern during the etching of the aluminum oxide in step (e) is not higher than 3 nm/min.

12. A method according to claim 5, wherein an etching rate for the mask pattern during the etching of the aluminum oxide in step (e) is not higher than 3 nm/min.

13. A method according to claim 11, wherein a depositing rate of polymer film on the mask pattern during the etching of the aluminum oxide in step (e) is not higher than 10 nm/min.

14. A method of manufacturing a thin film magnetic head according to claim 7, wherein the thickness of the mask pattern is not larger than 1 μm.

15. A method of manufacturing a thin film magnetic head according to claim 8, wherein the thickness of the mask pattern is not larger than 1 μm.

* * * * *